US006728669B1

(12) United States Patent
Benno

(10) Patent No.: US 6,728,669 B1
(45) Date of Patent: Apr. 27, 2004

(54) RELATIVE PULSE POSITION IN CELP VOCODING

(75) Inventor: Steven A. Benno, Dover, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 83 days.

(21) Appl. No.: 09/633,465

(22) Filed: Aug. 7, 2000

(51) Int. Cl.[7] ............................................ G01L 19/04
(52) U.S. Cl. ........................................ 704/219; 704/223
(58) Field of Search ................................ 704/214, 219, 704/223

(56) References Cited

U.S. PATENT DOCUMENTS 4,625,286 A * 11/1986 Papamichalis et al. ...... 704/219
4,932,061 A 6/1990 Kroon et al.
5,704,003 A * 12/1997 Kleijn et al. ................ 704/216
5,708,757 A * 1/1998 Massaloux .................. 704/220
5,754,976 A 5/1998 Adoul et al.
5,778,338 A * 7/1998 Jacobs et al. ............ 704/200.1
5,924,062 A * 7/1999 Maung ....................... 704/217
5,963,897 A 10/1999 Alpuente et al.
6,067,511 A * 5/2000 Grabb et al. ................ 704/208
6,094,629 A * 7/2000 Grabb et al. ................ 704/206
6,119,082 A * 9/2000 Zinser et al. ............... 704/219
6,138,092 A * 10/2000 Zinser et al. ............... 704/208
6,233,550 B1 * 5/2001 Gersho et al. .............. 704/208
6,240,386 B1 * 5/2001 Thyssen et al. ............. 704/220
6,311,154 B1 * 10/2001 Gersho et al. .............. 704/219
6,334,105 B1 * 12/2001 Ehara ......................... 704/201
6,539,349 B1 * 3/2003 Benno ........................ 704/219

OTHER PUBLICATIONS

"Novel Quantization Schemes for Multi–Purpose Coder at 5 KBPS"; 1994 International Symposium on Speech, Image Processing and Neural Networks, Apr. 13–16, 1994, Hong Kong; Dept. of Electronic Engineering, City of Polytechnic of Hong Kong, 83 Tat Chee Ave., Hong Kong; 4 pgs; 1994.

* cited by examiner

*Primary Examiner*—Doris H. To
*Assistant Examiner*—Michael N. Opsasnick

(57) ABSTRACT

An apparatus and method for vocoding an input signal comprising a linear predictive filter for generating a filtered signal with a first signal pulse and a second signal pulse in response to receiving the input signal and a processor having a lookup table with a plurality of track positions. The first signal pulse is associated with a first track position and the second signal pulse is associated with a second track position relative to the first signal pulse resulting in a plurality of excitation parameters. Additionally, the apparatus has a transmitter which transmits the plurality of excitation parameters in a transmission signal in response to receiving the plurality of excitation parameters from the processor.

18 Claims, 6 Drawing Sheets

FIG. 5

470

402, 404, 406, 408, 410, 412, 414, 416

| TRACK \ POSITION | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | 0 | 4 | 8 | 12 | 16 | 20 | 24 | 28 | 32 | 36 | 40 | 44 | 48 | 52 | 56 | 60 |
| 2 | 1 | 5 | 9 | 13 | 17 | 21 | 25 | 29 | 33 | 37 | 41 | 45 | 49 | 53 | 57 | 61 |

FIG. 6

500

506, 502, 504, 508, 510, 512, 514, 516

| TRACK \ POSITION | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | 0 | 4 | 8 | 12 | 16 | 20 | 24 | 28 | 32 | 36 | 40 | 44 | 48 | 52 | UNUSED | UNUSED |
| 2 | −7 | −6 | −5 | −4 | −3 | −2 | −1 | 1 | 2 | 3 | 4 | 5 | 6 | 7 | UNUSED | UNUSED |

600

RELATIVE PULSE POSITION IN CELP VOCODING

BACKGROUND OF THE INVENTION

This invention relates to voice compression, and in particular, to code excited linear prediction (CELP) vocoding.

A voice encoder/decoder (vocoder) compresses speech signals in order to reduce the transmission bandwidth required in a communications channel. By reducing the transmission bandwidth required per call, it is possible to increase the number of calls over the same communication channel. Early speech coding techniques, such as the linear predictive coding (LPC) technique, use a filter to remove the signal redundancy and hence compress the speech signal. The LPC filter reproduces a spectral envelope that attempts to model the human voice. Furthermore, the LPC filter is excited by receiving quasi periodic inputs for nasal and vowel sounds, while receiving noise-like inputs for unvoiced sounds.

There exists a class of vocoders known as code excited linear prediction (CELP) vocoders. CELP vocoding is primarily a speech data compression technique that at 4–8 kbps can achieve speech quality comparable to other 32 kbps speech coding techniques. The CELP vocoder has two improvements over the earlier LPC techniques. First, the CELP vocoder attempts to capture more voice detail by extracting the pitch information using a pitch predictor. Secondly, the CELP vocoder excites the LPC filter with a noise like signal derived from a residual signal created from the actual speech waveform.

CELP vocoders contain three main components; 1) short term predictive filter, 2) long term predictive filter, also known as pitch predictor or adaptive codebook, and 3) fixed codebook. Compression is achieved by assigning a certain number of bits to each component which is less than the number of bits used to represent the original speech signal. The first component uses linear prediction to remove short term redundancies in the speech signal. The error, or residual, signal that results from the short term predictor becomes the target signal for the long term predictor.

Voiced speech has a quasi-periodic nature and the long term predictor extracts a pitch period from the residual and removes the information that can be predicted from the previous period. After the long term and short term predictive filters, the resulting residual signal is a mostly noise-like signal. Using analysis-by-synthesis, a fixed codebook search finds a best match to replace the noise-like residual with an entry from its library of vectors. The code representing the best matching vector is transmitted in place of the noisy residual. In algebraic CELP (ACELP) vocoders, the fixed codebook consists of a few non-zero pulses and is represented by the locations and signs (e.g. +1 or −1) of the pulses.

In a typical implementation, a CELP vocoder will block or divide the incoming speech signal into frames, updating the short term predictor's LPC coefficients once per frame. The LPC residual is then divided into subframes for the long term predictor and the fixed codebook search. For example, the input speech may be blocked into a 160 sample frame for the short term predictor. The resulting frame may then be broken up into subframes of 53 samples, 53 samples, and 54 samples. Each subframe is then processed by the long term predictor and the fixed codebook search.

Referring to FIG. 1, an example of a single frame of a speech signal 100 is shown. The speech signal 100 is made up of voiced and unvoiced signals of different pitches. The speech signal 100 is received by a CELP vocoder having an LPC filter. The first step of the CELP vocoder is to remove short term redundancies in the speech signal. The resulting signal with the short term redundancies removed is the residual speech signal 200, FIG. 2.

The LPC filter is unable to remove all of the redundant information and the remaining quasi-periodic peeks and valleys in the filtered speech signal 200 are referred to as pitch pulses. The short term predictive filter is then applied to speech signal 200 resulting in the short term filtered signal 300, FIG. 3. The long term predictor filter removes the quasi-periodic pitch pulses from the residual speech signal 300, FIG. 3, resulting in a mostly noise-like signal 400, FIG. 4, which becomes the target signal for the fixed codebook search. FIG. 4 is a plot of a 160 sample frame of a fixed codebook target signal 350 divided into three subframes 354, 356, 358. The code value is then transmitted across the communication network.

In FIG. 5, the lookup table 470 that maps the position of the pulses in a subframe is shown. The pulses within the subframe are constrained to lie in one of sixteen possible positions 402 within the lookup table. Because each track 404 has sixteen possible positions 402, only four bits are required to identify each pulse location. Each pulse mapping occurs in an individual track 404. Therefore, two tracks 406, 408 enables the mapping of the pulse positions of two signal pulses from the subframe.

In the current example, the subframe 354, FIG. 4, has only 53 samples in the excitation, making position 0–52 the only valid positions. Because of the way the tracks 406, 408, FIG. 5, are divided positions that exceed the length of the original excitation are present in each track. Positions 56 and 60 in track 1, and positions 57 and 61 in track 2 are invalid and unused. The location of the first two pulses 310, 312, FIG. 4, corresponds to sample thirteen and sample seventeen. By using the table 400, FIG. 5, it is determined that sample thirteen lies in position three 410 in the first track 406. The second pulse is in sample seventeen and lies in second track 408 at position four 412. Therefore, the pulses can be represented and transmitted as four bits each respectively. The other pulses 314, FIG. 4, 316, 318, 320 and 322 in the subframe 354 are ignored because the code book has only two tracks.

The pulse position is constrained by the absolute pulse position in the tracks. Disadvantageously, the CELP vocoder tends to place pulses in adjacent positions in the tracks. By placing the pulses in adjacent positions in the tracks, the start of the speech sound is encoded rather than a more balance encoding of the utterance. Additionally, as the bit rate for the vocoder decreases and fewer pulses are used, the voice quality is adversely affected by inefficient placement of pulses into tracks. What is needed is a method to reduce the occurrence of pulses being placed in adjacent track positions.

SUMMARY OF THE INVENTION

The inefficiency of absolute track positions placement is eliminated by the implementation of placement of a signal pulse in a second track relative to the position of a signal pulse in the first track. Implementing relative positioning of the N+1 signal pulses in the N+1 tracks during encoding of a signal pulse results in increased signal quality of the decoded signal. The increased signal quality is achieved by more precise placement of pulses in the tracks and by reducing the occurrence of adjacent placement of signal pulse positions within the tracks.

BRIEF DESCRIPTION OF THE DRAWINGS

The foregoing objects and advantageous features of the invention will be explained in greater detail and others will be made apparent from the detailed description of the present invention, which is given with reference to the several figures of the drawing, in which:

FIG. 5 is a diagram of a known CELP vocoder codebook lookup table with signal pulses constrained to one of sixteen possible pulse positions;

FIG. 6 is a diagram of a CELP vocoder codebook having relative constrained pulse positions in accordance with an embodiment of the invention;

DETAILED DESCRIPTION

Figure 1:
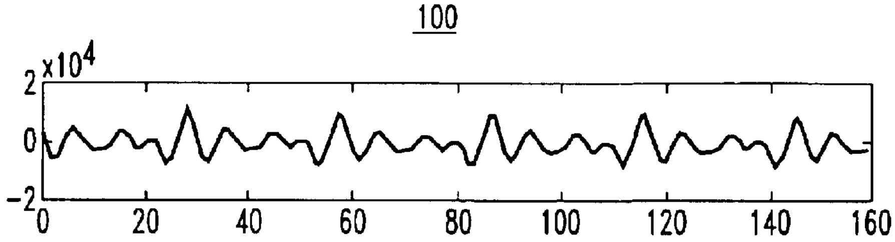
FIG. 1 illustrates a single frame of a speech signal.
Figure 2:
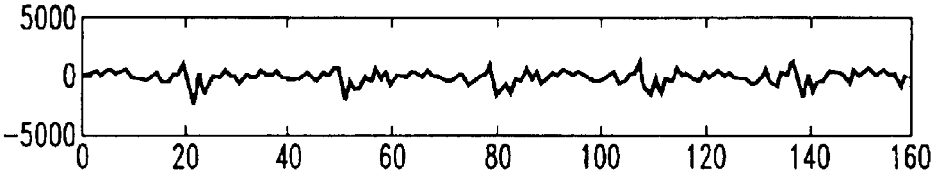
FIG. 2 illustrates a short term periodic filtered single speech frame.
Figure 3:
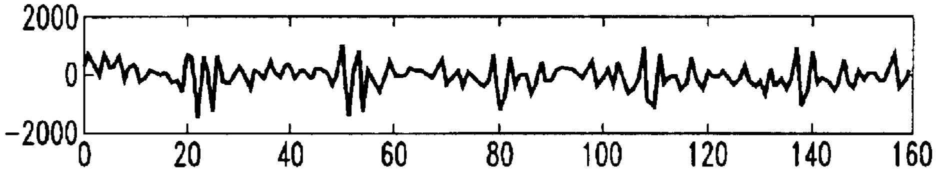
FIG. 3 illustrates an adaptive code book filtered single speech frame.
Figure 4:
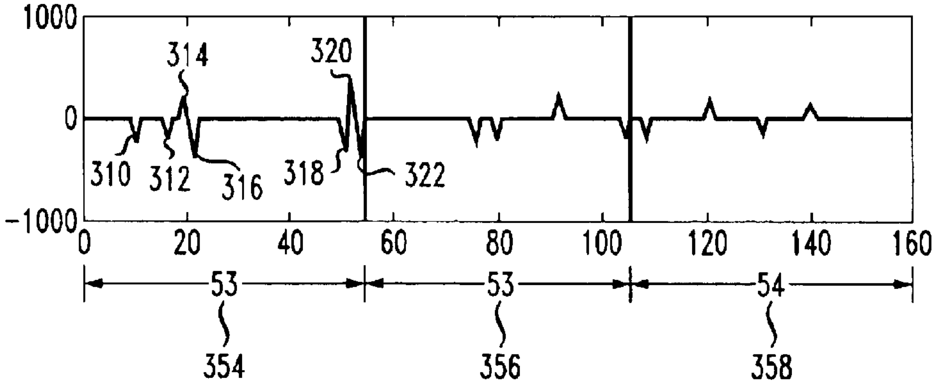
FIG. 4 illustrates a known method of structuring 160 sample speech frame divided into three subframes.

In FIG. 6, a two track codebook table with relative constrained pulse positions is shown. Table 500 contains two pulse position tracks 502, 504 (commonly referred to as "tracks") identifying sixteen possible signal pulse positions 506 for each track. The fixed codebook entries zero through thirteen 508 in track one 502 and track two 504 are possible valid pulse positions. The pulse table positions fourteen 510 and fifteen 512 in the codebook are unused in both tracks. Additionally, the possible first pulse positions in the first track is constrained to lie at a pulse position divisible by four (i.e. 0, 4, 8, . . . , 52). The second pulse position in the second track is relative to the index position 506 of the first signal pulse in the first track.

Rather than encoding signal pulses in adjacent track positions, a relative positioning of the second signal pulse occurs. By having fewer adjacent signal pulses encoded in the track, the signal pulses are better able to reproduce the bursts energy which improves the voice quality of the signal decoded by the vocoder. A single signal pulse is encoded in each of the two tracks 502 and 504 in the present embodiment. By positions the second signal pulse in the second track in relation to the first signal pulse in the first track an increase in the quality of the decoded utterance is achieved. In an alternate embodiment, the codebook table contains more than two tracks and the additional signal pulses in tracks are relative to an earlier track position of an earlier signal pulse.

In the present embodiment the relative location of the second signal pulse in the second track is to the first signal pulse in the first track. In an alternate embodiment the relative position of the second signal pulse in the second track is relative to the first signal pulse sample position. In yet another embodiment, the signal pulse position in the second track may be grouped in a non-sequential order (i.e. 1, −1, 7, −7, 2, −2, 6, −6, 3, −3, 5, −5, 4, −4).

Figure 7:
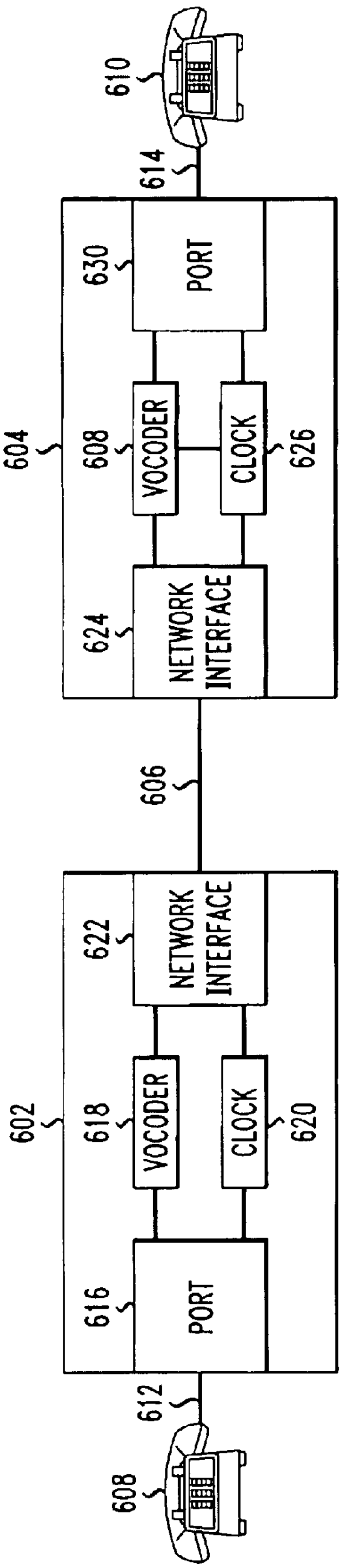
FIG. 7 is a diagram of a communication system with a transmitting device and receiver device using CELP vocoding in accordance with an embodiment of the invention.

Turning to FIG. 7, a communication system 600 having a transmitter device 602 and a receiver device 604 is shown. The transmitter and receiver communication devices 602, 604 are coupled together by a communication path 606. The communication path 606 may selectively be a wire based network (such as a local area network, wide area network, the Internet, ATM network, or public telephone network) or a wireless network (such as cellular, microwave, or satellite network). The main requirement of the communication path 606 is the ability to transfer digital data between the transmitter 602 and the receiver 604.

Each device 602, 604 has a respective signal input/output units 608, 610. Units 608, 610 are shown as telephonic devices that transfer analog voice signals to and from the transmitter device 602 and receiver device 604. The signal input/output unit 608 is coupled to the transmitter device 602 by a two-wire communication path 612. Similarly, the other signal input/output unit 610 is coupled to the receiver device 604 over another two-wire communication path 614. In an alternate embodiment, the signal input unit is incorporated in the transmitting and receiving communication devices (i.e. speakers and microphones built into the transmitting and receiving devices)or communicate over a wireless communication path (i.e. cordless telephone).

The transmitter device 602 contains an analog signal port 616 coupled to the two-wire communication path 612, a CELP vocoder 618, and a controller 620. The controller 620 is coupled to the analog signal port 616, the vocoder 618, and a network interface 622. Additionally, the network interface 622 is coupled to the vocoder 618, the controller 620, and the communication path 606.

Similarly, the receiver device 604 has another network interface 624 coupled to another controller 626, the communication path 606, and another vocoder 628. The other controller 626 is coupled to the other vocoder 628, the other network interface 624, and another analog signal port 630. Additionally, the other analog signal port 630 is coupled to the other two-wire communication path 614.

A voice signal is received at the analog port 616 from the signal input device 608. The controller 620 provides the control and timing signals for the transmitter device 602 and enables the analog port 161 to transfer the received signal to the vocoder 618 for signal compression. The vocoder 618 has a fixed codebook with a data structure shown in FIG. 6 for compressing the received signal. The data structure 500, FIG. 6, associates the first signal pulse from the filtered signal to a pulse position within the first track. Furthermore, a second signal pulse is associated with a second pulse position and is determined relative to the first pulse position of the first signal pulse in the first track.

Two signal pulses are kept from being adjacently assigned in the tracks by assignment of the second pulse position relative to the first pulse position. The first signal pulse is encoded and assigned a pulse position in the first track 502 and the pulse position of the second signal pulse in the second track 504 is encoded relative to the first track 502. The relative encoding of the second pulse position results in a compressed signal having a greater likelihood that the first pulse position is not adjacent to the second pulse position. The compressed signal is then sent from the vocoder 618, FIG. 7, to the network interface 622. The network interface 622 transmits the compressed signal across the communication path 606 to the receiver device 604.

The other network interface 624 located in the receiver device 604 receives the compressed signal. The receiver controller 626 enables the received compressed signal to be transferred to the receiver vocoder 628. The receiver vocoder 628 decodes the compressed signal by using a lookup table 500, FIG. 6. The vocoder 628, FIG. 7, regenerates an analog signal from the received compressed signal using the lookup table 500, FIG. 6. The lookup table reproduces the fixed codebook contribution and is then filtered by the long term and short term predictor. The analog signal is sent via the receiver analog signal port 630, FIG. 7, to the receiver signal input/output device 610.

Figure 8:
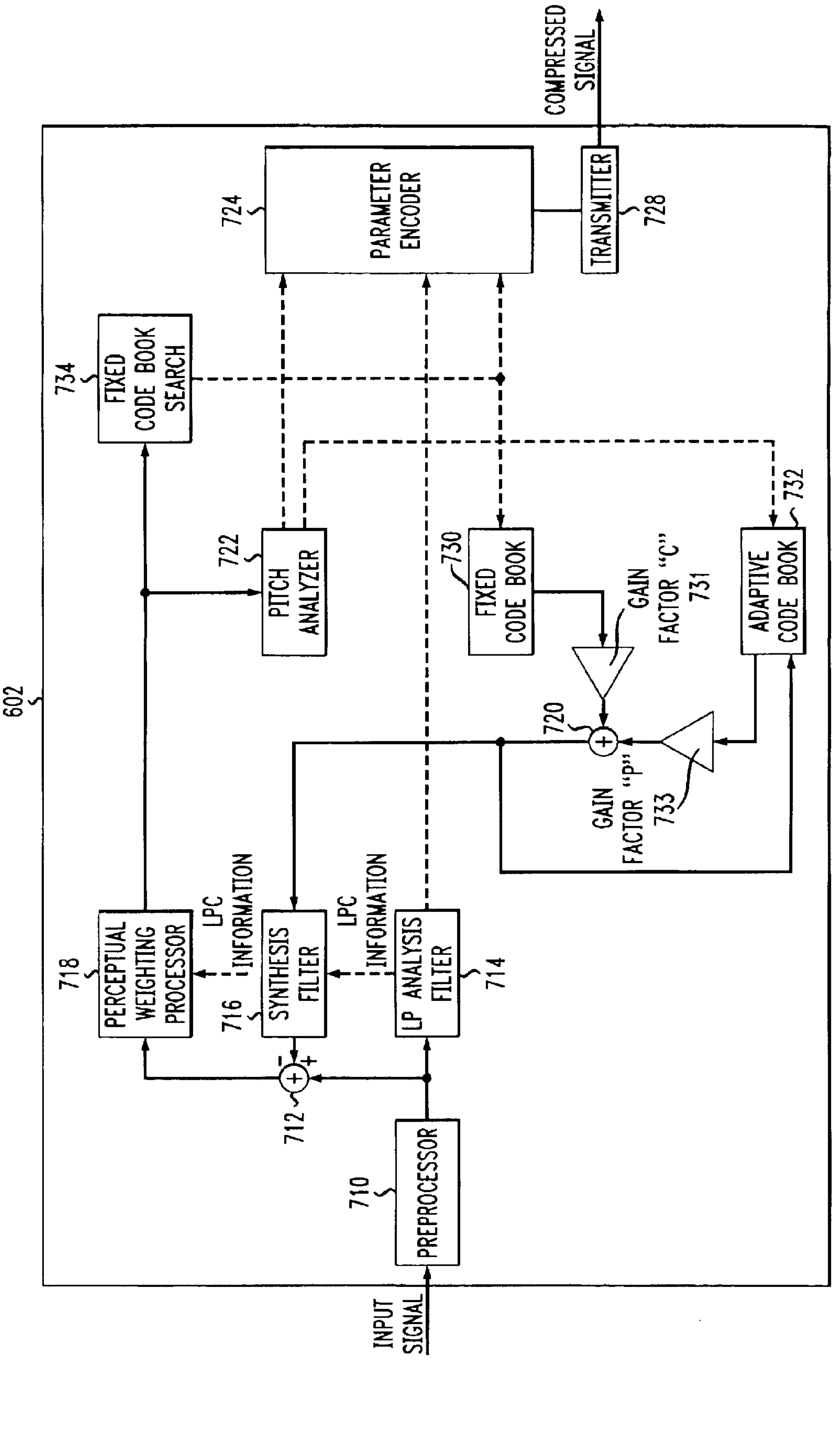
FIG. 8 is a diagram of the transmitting device having a CELP vocoder encoding a voice signal in accordance with an embodiment of the invention.

Turning to FIG. 8, the signal processing of the analog speech signal by the transmitter 602 is shown. A preprocessor 710 has an input for receiving an analog signal and is coupled to an LP filter 714, and a signal combiner 712. The signal combiner 712 combines the signal from the preprocessor 710 and a synthesis filter 716. The output of the signal combiner 712 is coupled to the perceptional weighting processor 718. The synthesis filter 716 is coupled to the LP analysis filter 714, signal combiner 712, another signal combiner 720, an adaptive codebook 732, and a pitch analyzer 722. The pitch analyzer 722 is coupled to the perceptional weighting processor 718, a fixed codebook search 734, an adaptive codebook 732, the synthesis filter 716, the other signal combiner 720, and a parameter encoder 724. The parameter encoder 724 is coupled to a transmitter 728, the fixed codebook search 734, fixed codebook 730, the LP filter 714, and the pitch analyzer 722.

The analog signal is received at the preprocessor 710 from the analog device 608, FIG. 7. The preprocessor 710, FIG. 8, processes the signal and adjusts the gain and other signal characteristics. The signal from the preprocessor 710 is then routed to both the LP analysis filter 714 and the signal combiner 712. The coefficient information generated by the LP analysis filter 714 is sent to the synthesis filter 716, the perceptual weighting processor 718, and the parameter encoder 724. The synthesis filter 716 receives the LP coefficient information from the LP filter 714 and a signal from the other signal combiner 720. The synthesis filter 716, which models the coarse short term spectral shape of speech, generates a signal that is combined with the output of the preprocessor 710 by the signal combiner 712. The resulting signal from the signal combiner 712 is filtered by the perceptual weighting processor 718. The perceptual weighting processor 718 also receives LP coefficient information from the LP filter 714. The perceptual weighting processor 718 is a post-filter in which the coding distortions are effectively "masked" by amplifying the signal spectra at frequencies that contain high speech energy, and attenuating those frequencies that contain less speech energy.

The output of the perceptual weighting processor 718 is sent to the fixed codebook search 734 and the pitch analyzer 722. The fixed codebook search 734 generates the code values that are sent to the parameter encoder 724 and the fixed codebook 730. The fixed codebook search 734 is shown separate from the fix codebook 730, but may alternatively be included in the fixed codebook 730 and does not have to be implemented separately. Additionally, the fixed codebook search has access to the data structure of the lookup table 500, FIG. 6, and the determination of the second pulse position relative to the first pulse position allows for more precise pulse signal information to be encoded and reduces the occurrences of the code book encoding adjacent pulses.

The pitch analyzer 722, FIG. 8, generates pitch data that is sent to the parameter encoder 724 and the adaptive codebook 732. The adaptive codebook 732 receives the pitch data from the pitch analyzer 722, and a feedback signal from the signal combiner 720 to model the long term (or periodic) component of the speech signal. The output of the adaptive codebook signal is combined with the output of the fixed codebook 730 by the signal combiner 720.

The fixed codebook 730 receives the code values generated by the fixed codebook search 734 and regenerates a signal. The generated signal is combined with the signal from the adaptive codebook 732 by signal combiner 720. The resulting combined signal is then used by the synthesis filter 716 to model the short term spectral shape of the speech signal and fed back to the adaptive codebook 732.

The parameter encoder receives parameters from the fixed codebook search 734, the pitch analyzer 722, and the LP filter 714. The parameter encoder using the received parameters generates the compressed signal. The compressed signal is then transmitted by the transmitter 728 across the network.

In an alternate embodiment of the above system, the encoder and decoder portions of the vocoder reside in the same device, such as a digital answering machine. A communication path in such an embodiment is a data bus that allows the compressed signal to be stored and retrieved from a memory.

Figure 9:
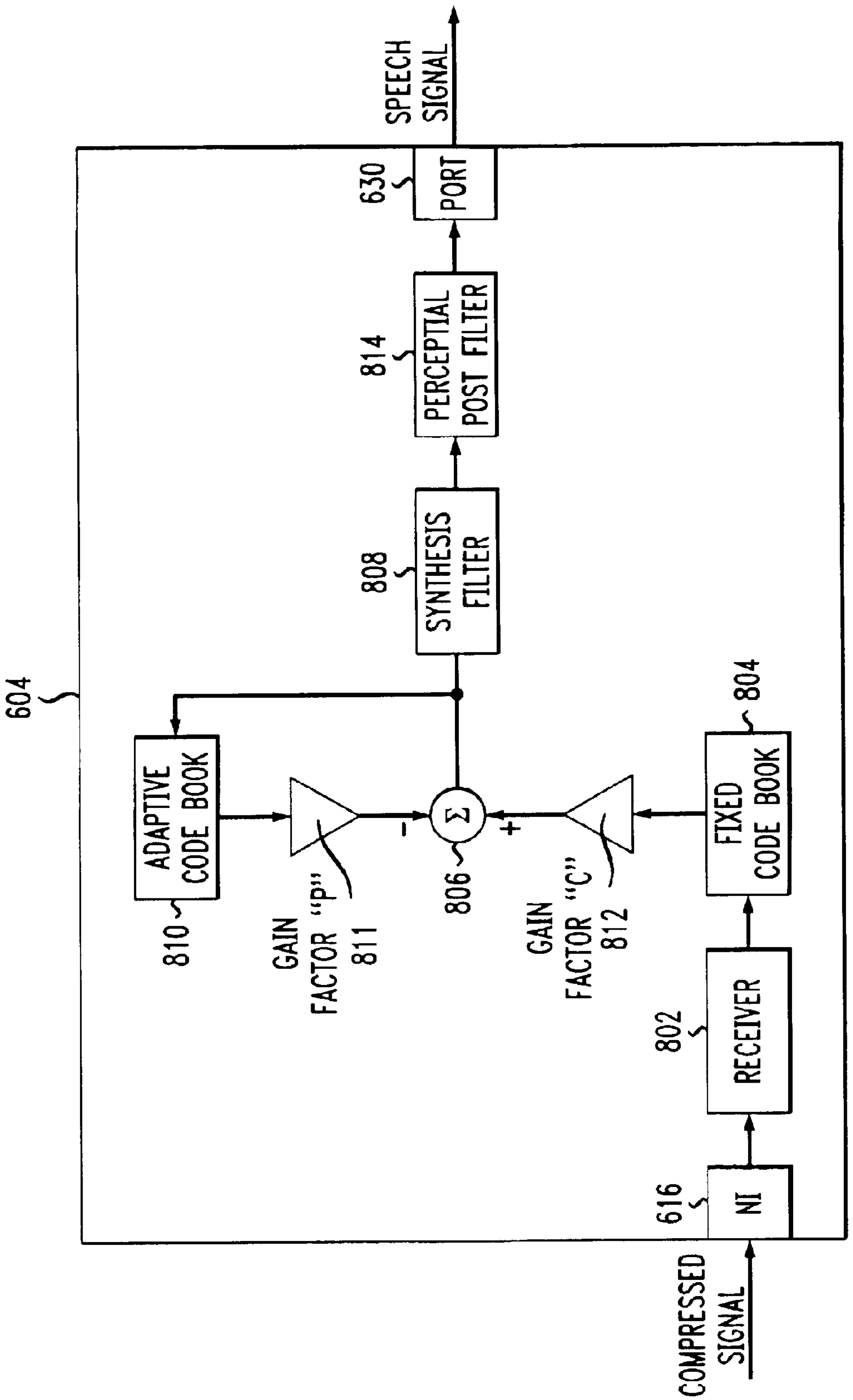
FIG. 9 is a diagram of the receiving device have a CELP vocoder in accordance with an embodiment of the invention.

In FIG. 9, a diagram of the receiver device having a CELP vocoder in accordance with an embodiment of the invention is shown. The receiver device 604 has a network interface 661 coupled to a receiver 802. A fixed codebook 804 is coupled to the receiver 802 and a gain factor "c" 812. The signal combiner 806 is coupled to a synthesis filter 808, the gain factor "p" 811 and a gain factor "c" 812. The adaptive codebook 810 is coupled to the gain factor "p" 811 and the output of the signal combiner 806. The synthesis filter 808 is connected to the output of the signal combiner 806 and a perceptual post filter 814. The perceptual post filter is coupled to the other analog port 630 and the synthesis filter 808.

The compressed signal is received by the receiver device 604 at the network interface 616. The receiver 802 unpacks the data from the compressed signal received at the network interface 616. The data consists of a fixed codebook index, a fixed codebook gain, an adaptive codebook index, adaptive codebook gain, and an index for the LP coefficients. The fixed codebook 804 contains a lookup table 500, FIG. 6, data structure. The fixed codebook 804, FIG. 9, generates a signal that is combined by signal combiner 806 with the signal from the adaptive codebook 810 and the gain factor 812. The combined signal from the signal combiner 806 is then received at the synthesis filter 808 and fed back into the adaptive codebook 810. The synthesis filter 808 uses the combined signal to regenerate the speech signal. The regenerated speech signal is passed through the perceptual post filter 814 that adjusts the speech signal. The speech signal is then sent by the analog port 630 to the receiver that has a similar codebook.

Figure 10:
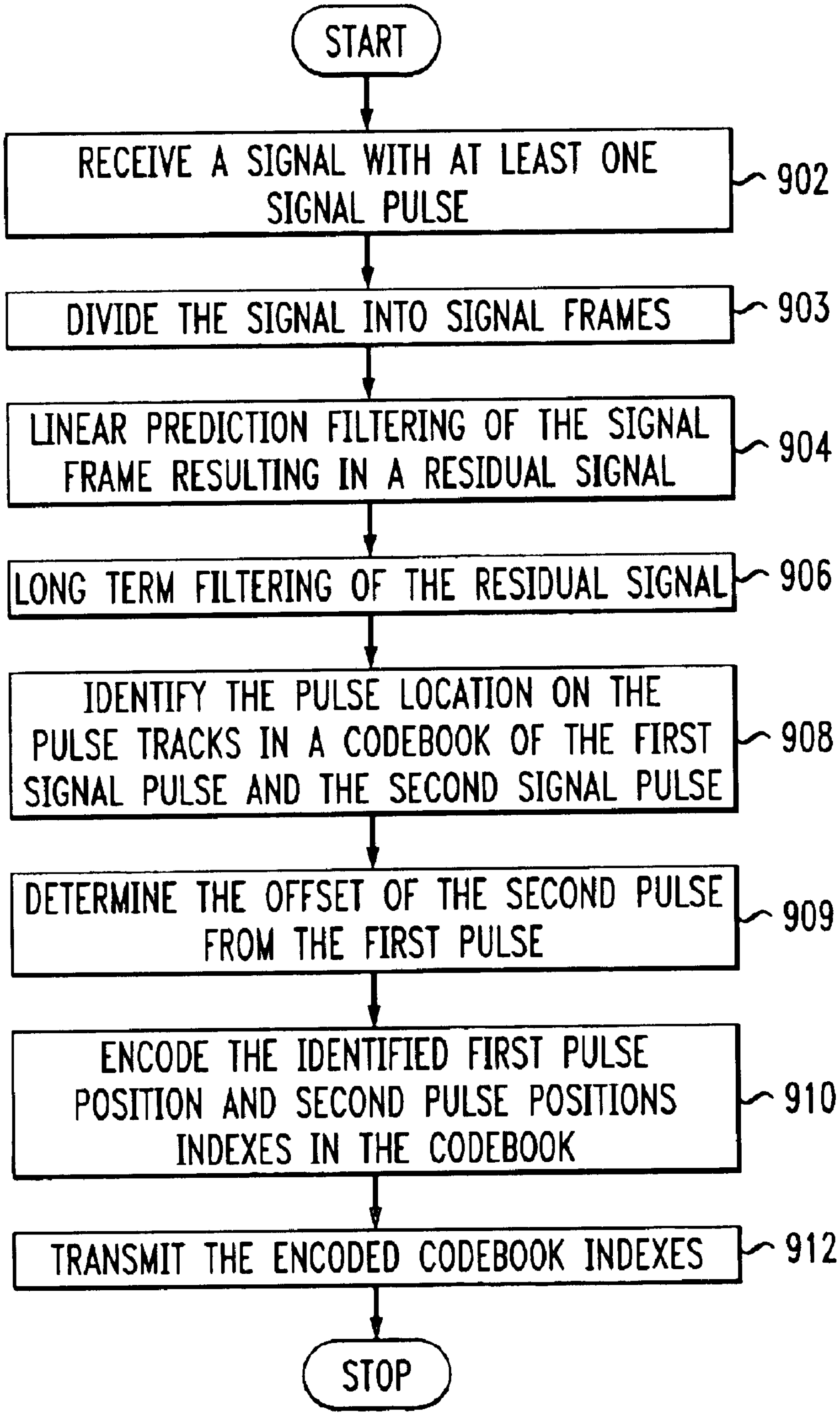
FIG. 10 is a flow chart of a method of vocoding a voice signal in accordance with an embodiment of the invention.

Turning to FIG. 10, a flow chart illustrating a method of vocoding using a lookup table or codebook having pulse position in the N+1tracks relative to the prior pulse positions is shown. In step 902, an input signal (e.g. an analog voice signal) is received at the receiver device 604, FIG. 7. The input signal is divided into signal frames in step 903, FIG. 10, so discrete signal portions can be processed. Each signal frame is processed by a filter 714, FIG. 8, in step 904, FIG. 10, resulting in a filtered input signal that is referred to as a residual signal.

The filtered residual signal is further filtered by a long term filter, in step 906, FIG. 10 and the adaptive codebook 732, FIG. 8, translates or removes the long term signal redundancy from the filtered input signal having signal pulses. In step 908, FIG. 10, the fixed codebook index identifies the location of the first signal pulses within a first track. The fixed codebook 730, FIG. 8, contains a lookup table 500, FIG. 6, and the relative mapping of the second pulse position in the second track to the first pulse position in the first track. In step 909, the offset of the second pulse position is determined relative to the first pulse position and results in greater placement precision of the second pulse.

The lookup table 500 is used by the fixed codebook 730, FIG. 8, to generate a binary pattern that represents remaining pulse signals from the signal. A binary pattern is then encoded into a signal containing the index of the pulse positions, step 910, FIG. 10. The encoded signal is then transmitted across the communication path in step 912.

Current state of technology allows general purpose digital signal processors to be combined with other electronic elements in order to make a CELP vocoder that is configured by software. Therefore, a computer readable signal bearing medium may contain software code to implement a vocoder having additional constraints for restricting pulse positions in a codebook.

While the invention has been particularly shown and described with reference to a particular embodiment, it will be understood by those skilled in the art that various changes in form and details may be made therein without departing from the spirit and scope of the invention and it is intended that all such changes come within the scope of the following claims.

What is claimed is:

1. A method of vocoding an input signal comprising the steps of:

filtering the input signal resulting in a filtered signal having a first signal pulse and a second signal pulse;

encoding the first signal pulse by association of the first signal pulse with a first pulse position within a first track of a data structure, the first pulse position being one of a predetermined set of pulse positions within the first track; and assigning the second signal pulse to a second pulse position as a function of the first pulse position within a second track of the data structure, the second pulse position in the second track being in a non-adjacent relationship to the first pulse position in the first track.

2. The method of claim 1 in which the step of filtering further comprises the step of processing the signal with a linear predictive filter.

3. The method of claim 1 further comprising the step of dividing the signal into a plurality of signal frames.

4. The method of claim 3 in which the step of dividing further comprises the step of receiving an analog signal.

5. The method of claim 3 in which the step of dividing further comprises the step of receiving a digital signal.

6. The method of claim 1 in which the step of assigning further comprises the step of identifying an offset of the second signal pulse from the first signal pulse.

7. The method of claim 6 in which the step of identifying further comprises the step of calculating the offset of the first signal pulse position from a second signal pulse position.

8. An apparatus for vocoding an input signal comprising:

a linear predictive filter for generating a filtered signal with at least a first signal pulse and a second signal pulse in response to receiving the input signal;

a processor having a lookup table with a plurality of track positions in which the first signal pulse is assigned a first track position in the first plurality of track positions, the first pulse position being one of a predetermined set of pulse positions within the first track, and the second signal pulse is assigned a second track position in the second plurality of pulse positions as a function of the first track position of the first signal pulse resulting in a plurality of excitation parameters, the second pulse position in the second track being in a non-adjacent relationship to the first pulse position in the first track; and a transmitter which transmits the plurality of excitation parameters in a transmission signal in response to receiving the plurality of excitation parameters from the processor.

9. The apparatus of claim 8 further comprising an input port having a memory buffer to divide the input signal into input signal frames in response to the input port reception of the input port.

10. The apparatus of claim 8 in which the processor determines an offset of the second signal pulse from the first signal pulse in the filtered signal in the filtered signal.

11. The apparatus of claim 8 in which the processor determines an offset of the second signal pulse from the first the first track position.

12. The apparatus of claim 8 in which the input signal is an input analog signal.

13. The apparatus of claim 8 in which the input signal is a digital signal.

14. An article of manufacture comprising:

a computer-readable signal bearing medium having computer readable program code means embodied therein for vocoding of a signal, the computer readable program code means in said article of manufacture having;

means having a first computer readable program code for filtering the input signal resulting in a filtered signal having a first signal pulse and a second signal pulse;

means having a second computer readable program code for encoding the first signal pulse by association of the first signal pulse with a first pulse position within a first track of a data structure, the first pulse position being one of a predetermined set of pulse positions within the first track, and means having a third computer readable program code for assigning the second signal pulse to a second pulse position as a function of the first pulse position within a second track of the data structure, the second pulse position in the second track being in a non-adjacent relationship to the first pulse position in the first track.

15. The article of manufacture of claim 14 in which the fourth computer readable program code means in said article of manufacture further comprises a computer readable program code means for identifying an offset of the second signal pulse from the first signal pulse.

16. The article of manufacture of claim 15 in which the fourth computer readable program code means in said article of manufacture further comprises a computer readable program code means for calculating the offset of the first signal pulse position from a second signal pulse position.

17. The method of claim 1 in which the first pulse position in the first track is constrained to lie at a pulse position in the first track that is divisible by four.

18. The apparatus of claim 8 in which the first pulse position in the first track is constrained to lie at a pulse position in the first track that is divisible by four.

* * * * *